United States Patent
Tasi et al.

(10) Patent No.: US 6,665,198 B2
(45) Date of Patent: Dec. 16, 2003

(54) POWER SUPPLY APPARATUS AND METHOD THEREOF FOR INPUT HARMONIC CURRENT SUPPRESSION AND OUTPUT VOLTAGE REGULATION

(75) Inventors: Wen-Yin Tasi, Yungkang (TW); Hung-Liang Chou, Kaohsiung (TW); Chin-Chang Wu, Tainan (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/208,214

(22) Filed: Jul. 30, 2002

(65) Prior Publication Data

US 2003/0042877 A1 Mar. 6, 2003

(30) Foreign Application Priority Data

Aug. 31, 2001 (TW) ........................................ 90121700 A

(51) Int. Cl.$^7$ .................................................. H02J 1/02
(52) U.S. Cl. .............................. 363/39; 363/37; 307/46; 307/48; 307/66
(58) Field of Search ............................... 363/34, 35, 37, 363/39, 40, 41, 44; 323/205, 207, 299; 307/43, 44, 46, 48, 64, 66

(56) References Cited

U.S. PATENT DOCUMENTS 6,115,268 A * 9/2000 Chang et al. .................. 363/34
6,169,669 B1 * 1/2001 Choudhury ................... 363/37

* cited by examiner

*Primary Examiner*—Michael Sherry
*Assistant Examiner*—Gary L. Laxton
(74) *Attorney, Agent, or Firm*—Alston & Bird LLP

(57) ABSTRACT

An power supply apparatus for the input harmonic current suppression, input power factor compensation, and an output voltage regulation and a method thereof is provided. The power supply apparatus electrically connected to a AC power has a first power converter electrically connected in parallel with the AC power for providing a first compensating voltage and controlling the first compensating voltage to reduce harmonic components of an input current so as to cause the input current as a substantial sinusoidal wave and in phase with the input voltage, and a second power converter electrically connected in series with an output end of the power supply apparatus for providing a second compensating voltage in order to maintain the output voltage at a desired level and waveform. The related methods are also discussed.

24 Claims, 3 Drawing Sheets

POWER SUPPLY APPARATUS AND METHOD THEREOF FOR INPUT HARMONIC CURRENT SUPPRESSION AND OUTPUT VOLTAGE REGULATION

FIELD OF THE INVENTION

The present invention relates to a power supply apparatus and a method for an input harmonic current suppression, an input power factor compensation, and an output voltage regulation, and especially to those applied to an uninterruptible power supply system.

BACKGROUND OF THE INVENTION

Power supply circuits are commonly used in equipment such as uninterruptible power supply system, motor drives, and other applications. Conventional UPSs use a variety of different circuit topologies, including standby, line-interactive and on-line topologies. Generally, each of three topologies has advantages and disadvantages. The selection of an uninterruptible power supply is varied, which depends on the needs of the application.

The major difference between topologies is whether, under normal conditions, the load is supplied from a primary AC power source. A typical standby UPS topology includes a switch that directly connects the load to the primary AC power source under normal conditions and that transfers the load to a secondary AC source derived from a battery or other auxiliary source when the primary AC power source fails. Due to the time needed to operate the switch, such a standby UPS often exhibit a significant interruption in power delivered to the load. In addition, standby UPSs often do not compensate for the power quality, e.g., voltage sag, voltage dip, harmonic distortion and low power factor. Nevertheless, the standby topology is often used for low-cost UPSs, because it is more cheaper to produce than other topologies.

A typical on-line UPS includes a series train of an AC/DC converter and a DC/AC inverter. The AC/DC converter converts the primary AC power source to a DC voltage on a DC bus and the DC/AC inverter converts the DC voltage to an AC output voltage at a load from an AC input voltage provided by the primary AC power source such as the utility. For this reason, on-line UPSs are also sometimes called a 'double-conversion' UPS. Typically, the on-line UPS includes the DC bus link that is used to isolate the load from disturbance and other sag of the primary AC power source. Also, the DC bus is also coupled to an auxiliary source of power, such as a battery, which maintains the DC voltage on the DC bus as the primary AC power source fails. In addition, the AC output voltage of an on-line UPS is well regulated, and there's no interruption in the supply to the load when the primary AC power source fails. Other circuits, such as filters and regulators, may be included in the path with the rectifier and the inverter. An on-line UPS can also have a power factor correction (PFC) circuit built into the rectifier. However, an on-line UPS is less efficient than a standby UPS, but guarantees that the supply to the load is clean and well regulated inspite of the condition of the primary AC power source.

A line interactive UPS may use a switch arrangement similar to that of the standby topology, but may also include means for regulating and conditioning the AC power source to improve the power quality. The Line-interactive UPS is limited in capacity, which is impractical over 5 KVA.

Hence, the development of an UPS with the performance of high input power factor, low input current harmonic, high efficiency and compensation for voltage sags and dips is very important. UPS systems are, however, relatively very expensive. It is therefore attempted by the applicant to deal with the above situation encountered with the prior art.

SUMMARY OF THE INVENTION

It is therefore an object of the present invention to propose a power supply apparatus and a method with the performance of input harmonic currents suppression, input power factor compensation, and an output voltage regulation.

According to an aspect of the present invention, a power supply apparatus includes an input port, an output port, an energy storage device for providing a first voltage, a first power converter electrically connected to the energy storage device for providing a first compensating voltage from the first voltage, and electrically connected in parallel with the input port for controlling the first compensating voltage such that an input current at the input port is a substantial sinusoidal wave and in phase with an input voltage at the input port, a link inductor electrically connected between the input port and the first power converter for providing isolation between the input voltage and the first compensating voltage, and a second power converter electrically connected in series with the output port for providing a second compensating voltage from the first voltage to maintain an output voltage at the output port.

Preferably, the power supply apparatus further includes a backup power supply function, which the first power converter provides the first compensating voltage as a main power when an AC power source at the input port is interrupted.

Preferably, an input power factor at the input port is approaching to a unity power factor.

Preferably, the first compensating voltage is a vector addition of the input voltage and a second voltage where a voltage vector of the second voltage is substantially perpendicular to a voltage vector of the input voltage.

Preferably, the power supply apparatus includes an uninterruptible power supply (UPS).

Preferably, the first voltage is a DC bus voltage.

Preferably, the energy storage device includes a battery.

Preferably, the first power converter includes a first switching circuit electrically connected to the energy storage device for providing the first compensating voltage from the first voltage, a first filter inductor having one end electrically connected to an output end of the first switching circuit and the other end electrically connected to the link inductor for filtering the first compensating voltage, a first filter capacitor electrically connected in parallel with the first filter inductor for filtering the first compensating voltage, and a first control device electrically connected to the first switching circuit for controlling the first switching circuit to generate the first compensating voltage in response to a first control signal.

Preferably, the first control device includes a first subtractor for subtracting a feedback signal of the first voltage from a first command signal to determine a second command signal, a first compensator electrically connected to the first subtractor for generating a third command signal by compensating the second command signal, a sinusoidal signal generator electrically connected to the AC power source for capturing both phase and frequency of the input voltage to generate a first sinusoidal signal with unity amplitude, a first phase shift circuit electrically connected to the sinusoidal signal generator for processing a phase shift of the first sinusoidal signal to generate a second sinusoidal signal, a multiplier electrically connected to the first phase shift circuit and the first compensator to multiply the third command signal by the second sinusoidal signal to generate a fourth command signal, a second subtractor electrically connected to the AC power source and the multiplier for subtracting the fourth command signal from an input voltage signal and to generate a fifth command signal, a third subtractor for subtracting a feedback signal of the first compensating voltage from the fifth command signal to generate a sixth command signal, a first controller electrically connected to the third subtractor for processing a signal processing of the sixth command signal to generate a first modulation signal, and a first pulse width modulation generator electrically connected to the first controller for transforming the first modulation signal to generate a first pulse width modulation signal which operates the first switching circuit to provide the first compensating voltage.

Preferably, the first command signal is a DC bus reference voltage signal.

Preferably, the feedback signal of the first voltage is a feedback signal of the DC bus voltage.

Preferably, the first phase shift circuit processes a 90° phase shift of the first sinusoidal signal to generate the second sinusoidal signal.

Preferably, the fifth command signal is a reference output voltage signal for the first power converter.

Preferably, the feedback signal of the first compensating voltage is a feedback signal of an output voltage at the first power converter.

Preferably, the second power converter includes a second switching circuit electrically connected to the energy storage device for providing a third voltage from the first voltage; a transformer having a primary winding electrically connected to the second switching circuit and a secondary winding electrically connected in series with the output port for transforming the third voltage to generate the second compensating voltage to maintain the output voltage at the output port, a second filter capacitor electrically connected to the output port for filtering the second compensating voltage, and a second control device electrically connected to the second switching circuit for controlling the second switching circuit to generate the third voltage in response to a second control signal.

Preferably, the second control device includes a second phase shift circuit for generating a capacitor current command signal by processing a phase shift of a seventh command signal; a fourth subtractor for subtracting a feedback signal of the output voltage from the seventh command signal to generate an eighth command signal, a second compensator electrically connected to the fourth subtractor for compensating the eighth command signal to generate a ninth command signal, a command summing module for generating a tenth command signal by subtracting the ninth command signal from the capacitor current command signal and adding a feedback signal of an output current, a fifth subtractor for subtracting a feedback signal of a secondary winding current of the transformer from the tenth command signal to generate an eleventh command signal, a second controller electrically connected to the fifth subtractor for processing a signal processing of the eleventh command signal to generate a second modulation signal, and a second pulse width modulation generator electrically connected to the second controller for transforming the second modulation signal to a second pulse width modulation signal which forces the second switching circuit to provide the third voltage.

Preferably, the seventh command signal is a reference output voltage signal for the power supply apparatus, which is in phase with the input voltage and has a constant amplitude.

Preferably, the capacitor current signal is a reference capacitor current signal.

Preferably, the tenth command signal is a reference secondary winding current signal.

It is therefore another aspect of the present invention to propose a power supply apparatus including an input port, an output port, an energy storage device for providing a first voltage, a first power converter electrically connected in parallel with the input port and connected to the energy storage device for providing a first compensating voltage from the first voltage as a backup power supply, a link inductor electrically connected between the input port and the first power converter for providing voltage isolation between an AC power source at the input port and the first power converter, and a second power converter electrically connected in series with the output port for providing a second compensating voltage from the first voltage to maintain the output voltage at the output port.

It is therefore another aspect of the present invention to propose a method of providing input harmonic current suppression, input power factor compensation, and output voltage regulation in a power supply apparatus which has an input port and an output port, wherein the power supply apparatus includes a first power converter electrically connected in parallel with the input port for providing a first compensating voltage, a link inductor electrically connected between an AC power source at the input port for providing isolation between the AC power source at the input port and the first power converter, and a second power converter electrically connected in series with the output port for providing a second compensating voltage, comprising the steps of: controlling the first compensating voltage such that an input current at the input port is a substantial sinusoidal wave and in phase with an input voltage at the input port; and controlling the second compensating voltage to maintain the output voltage at the output port.

Preferably, the first compensating voltage is a vector addition of the input voltage and a first voltage where a voltage vector of the first voltage is substantially perpendicular to a voltage vector of the input voltage.

Preferably, the input voltage is in phase with the input current and an input power factor is approaching to a unity power factor.

It is therefore a further aspect of the present invention to propose a method of providing input harmonic current suppression, input power factor compensation, and output voltage regulation in a power supply apparatus which has an input port and an output port, wherein the power supply apparatus includes an energy storage device for providing a first voltage, a first power converter electrically connected in parallel with the input port for providing a first compensating voltage from the first voltage, a link inductor electrically connected between the input port and the first power converter for providing isolation between an AC power source at the input port and the first power converter and a second power converter electrically connected in series with the output port for providing a second compensating voltage to maintain an output voltage at the output port, including the steps of determining a magnitude of a first command signal, sensing the first voltage to obtain a feedback signal of the first voltage for subtracting a feedback signal of the first voltage from the first command signal to generate a second command signal, compensating the second command signal to generate a third command signal, capturing both phase and frequency of the AC power source voltage to generate a first sinusoidal signal, processing a phase shift of the first sinusoidal signal to generate a second sinusoidal signal, multiplying the third command signal by the second sinusoidal signal to generate a fourth command signal, subtracting an input voltage signal by the fourth command signal to generate a fifth command signal, subtracting a feedback signal of the first compensating voltage from the fifth command signal to generate a sixth command signal, processing a signal processing of the sixth command signal to generate a first modulation signal, transforming the first modulation signal to generate a first pulse width modulation signal which operates the first power converter to provide the first compensating voltage, thereby causing the input current as a substantial sinusoidal wave and in phase with the input voltage, determining a seventh command signal, processing a phase shift of the seventh command signal to generate a capacitor current command signal, subtracting a feedback signal of the output voltage from the seventh command signal to generate an eighth command signal, compensating the eighth command signal to generate a ninth command signal, subtracting the ninth command signal from the capacitor current command signal and adding a feedback signal of the output current signal to generate a tenth command signal, subtracting a feedback signal of a secondary winding current from the tenth command signal to generate an eleventh command signal, processing a signal processing of the eleventh command signal to generate a second modulation signal, and transforming the second modulation signal to a second pulse width modulation signal which forces the second power converter to provide the second voltage to maintain the output voltage at a desired level.

The present invention may best be understood through the following description with reference to the accompanying drawings, in which:

DETAILED DESCRIPTION OF THE PREFERRED EMBODIMENT

Figure 1:
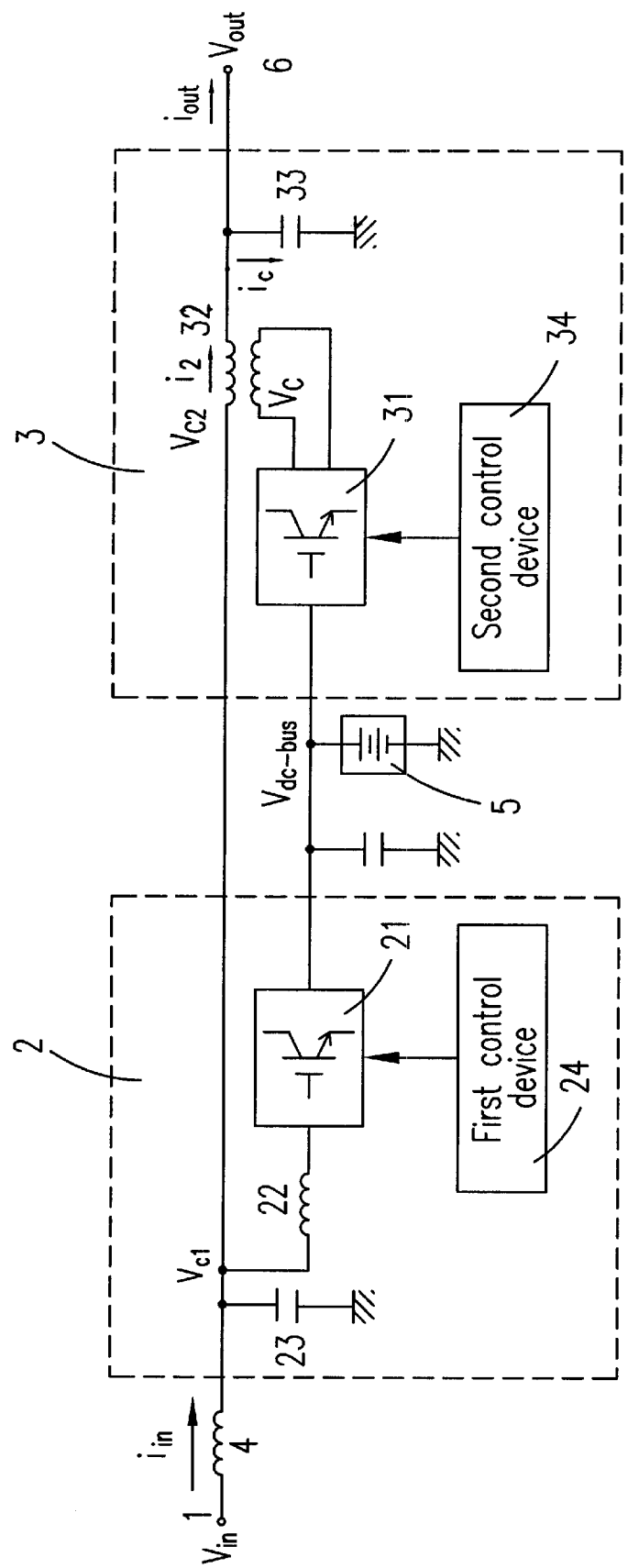
FIG. 1 is a block diagram illustrating a power supply apparatus for input harmonic currents suppression, input power factor compensation, and an output voltage regulation according to a preferred embodiment of the present invention.

FIG. 1 is a block diagram illustrating a power supply apparatus for input harmonic currents suppression, input power factor compensation, and an output voltage regulation according to a preferred embodiment of the present invention. As shown in FIG. 1, a power supply apparatus includes an input port 1, an output port 6, an energy storage device 5, a first power converter 2, a link inductor 4, and a second power converter 3. The energy storage device 5 is used for providing a first voltage $V_{dc\text{-}bus}$. The first power converter 2 is electrically connected to the energy storage device 5 for providing a first compensating voltage $V_{c1}$ from the first voltage $V_{dc\text{-}bus}$, and electrically connected in parallel with the input port 1 for controlling the first compensating voltage $V_{c1}$ such that an input current $i_{in}$ at the input port 1 is a substantial sinusoidal wave and in phase with an input voltage $V_{in}$ at the input port 1. The link inductor 4 is electrically connected between the input port 1 and the first power converter 2 for providing isolation between the input voltage $V_{in}$ and the first compensating voltage $V_{c1}$. And, a second power converter 3 is electrically connected in series with the output port 6 for providing a second compensating voltage $V_2$ from the first voltage $V_{dc\text{-}bus}$ to maintain an output voltage $V_{out}$ at a desired level, and desired waveform.

Meanwhile, the power supply apparatus further includes a backup power supply function, which means that the first power converter 2 provides the first compensating voltage $V_{c1}$ as a main power when an AC power source at the input port 1 is interrupted.

Moreover, the input current $i_{in}$ is in phase with the input voltage $V_{in}$ and the input power factor is approaching to an unity power factor. The first compensating voltage $V_{c1}$ is a vector addition of the input voltage $V_{in}$ and a second voltage where the second voltage is substantially perpendicular to the input voltage $V_{in}$. The power supply apparatus is an uninterruptible power supply (UPS). The first voltage is a DC bus voltage. The energy storage device is a battery.

Furthermore, the first power converter 2 includes a first switching circuit 21, a first filter inductor 22, a first filter capacitor 23 and a first control device 24. The first switching circuit 21 is electrically connected to the energy storage device 5 for providing the first compensating voltage $V_{c1}$ from the first voltage $V_{dc\text{-}bus}$. The first filter inductor 22 has one end electrically connected to an output end of the first switching circuit 21 and the other end electrically connected to the link inductor 4 for filtering the first compensating voltage $V_{c1}$. The first filter capacitor 23 is electrically connected in parallel with the first filter inductor 22 for filtering the first compensating voltage $V_{c1}$. And, the first control device 24 is electrically connected to the first switching circuit 2 for controlling the first switching circuit 21 to generate the first compensating voltage $V_{c1}$ in response to a first control signal. The second power converter 3 includes a second switching circuit 31, a transformer 32, a second filter capacitor 33, and a second control device 34.

The second switching circuit 31 is electrically connected to the energy storage device 5 for providing a third voltage $V_c$ from the first voltage $V_{dc\text{-}bus}$. The transformer 32 has a primary winding electrically connected to the second switching circuit 31 and a secondary winding electrically connected in series between the output port 6 and the output port 1 for transforming the second voltage $V_c$ to generate the second compensating voltage $V_{c2}$ to maintain the output voltage $V_{out}$ at the desired level. The second filter capacitor 33 is electrically connected to the output end of the power supply apparatus for filtering the second compensating voltage $V_{c2}$. The second control device 34 is electrically connected to the second switching circuit 31 for controlling the second switching circuit 31 to generate the third voltage $V_c$ in response to a second control signal.

Figure 2A:
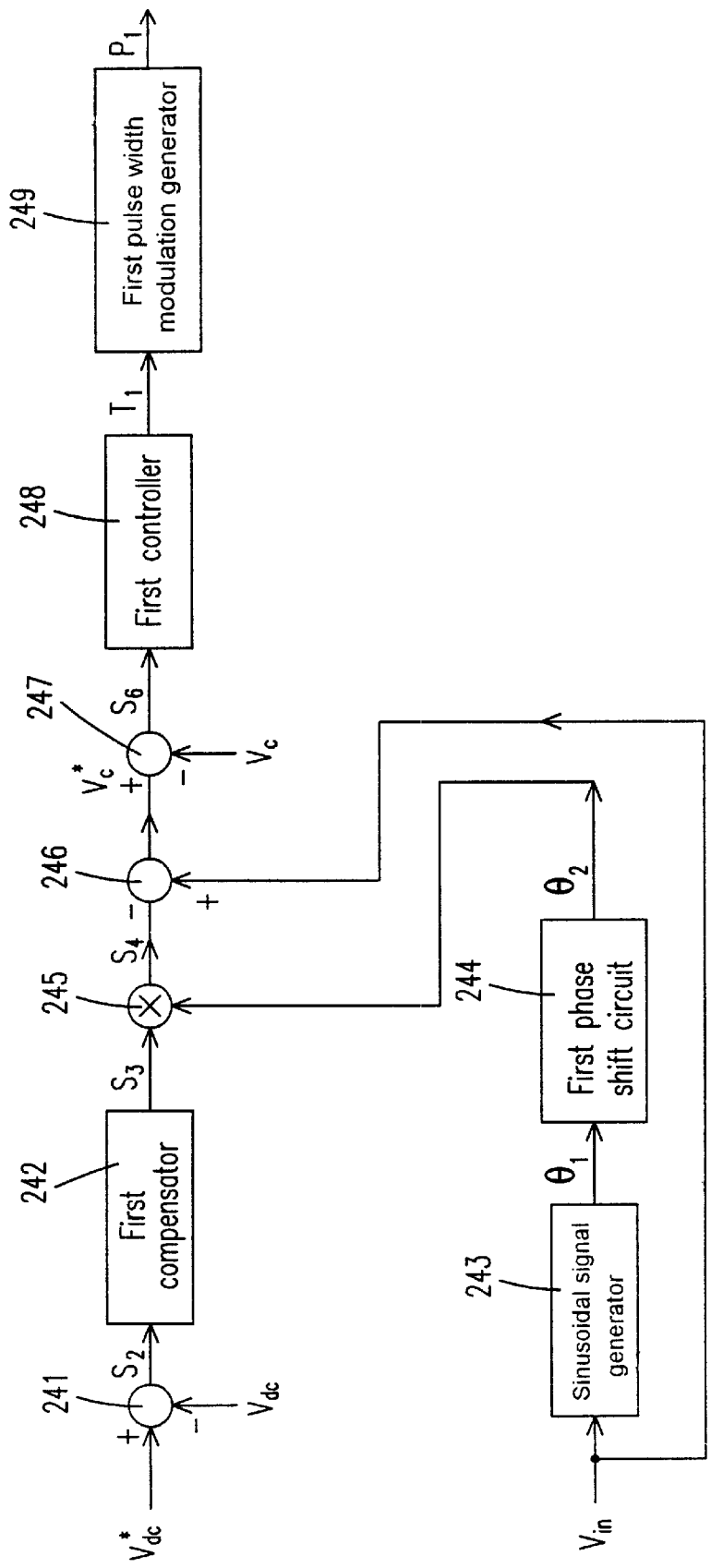
FIG. 2(a) is a block diagram illustrating a first control device according to a preferred embodiment of the present invention.

FIG. 2(a) is a block diagram illustrating a first control device according to a preferred embodiment of the present invention. As shown in FIG. 2(a), the first control device 24 includes a first subtractor 241, a first compensator 242, a sinusoidal signal generator 243, a first phase shift circuit 244, a multiplier 245, a second subtractor 246, a third subtractor 247, a first controller 248, and a first pulse width modulation generator 249. The first subtractor 241 is electrically connected to a DC bus reference voltage signal $V^*_{dc}$ and a feedback signal $V_{dc}$ of the first voltage $V_{dc\text{-}bus}$ for obtaining a difference of the DC bus reference voltage signal $V^*_{dc}$ and the feedback signal $V_{dc}$ of the first voltage $V_{dc\text{-}bus}$ to generate a second command signal $S_2$. The first compensator 242 is electrically connected to the first subtractor 241 for compensating the second command signal $S_2$ to generate a third command signal $S_3$. The sinusoidal signal generator 243 is electrically connected to the input voltage $V_{in}$ for capturing both phase and frequency of the input voltage $V_{in}$ to generate a first sinusoidal signal $\theta_1$. The first phase shift circuit 244 is electrically connected to the sinusoidal signal generator 243 for processing a 90° phase shift of the first sinusoidal signal $\theta_1$ to generate a second sinusoidal signal $\theta_2$. The multiplier 245 is electrically connected to the first phase shift circuit 244 and the first compensator 242 to multiply the third command signal $S_3$ by the second sinusoidal signal $\theta_2$ to generate a fourth command signal $S_4$. The second subtractor 246 is electrically connected to the input voltage $V_{in}$ and the multiplier 245 for obtaining a difference of the input voltage signal $V_{in}$ and the fourth command signal $S_4$ to generate a reference output voltage signal $V^*_c$ of the first power converter 2.

The third subtractor 247 subtracts the feedback signal of the first compensating voltage $V_{c1}$ from the reference output voltage signal $V^*_c$ to generate a sixth command signal $S_6$. The first controller 248 is electrically connected to the third subtractor 247 for processing the signal processing of the sixth command signal $S_6$ to generate a first modulation signal $T_1$. And, the first pulse width modulation generator 249 is electrically connected to the first controller 248 for transforming the first modulation signal $T_1$ to generate a first pulse width modulation signal $P_1$ which operates the first switching circuit 21 to provide the first compensating voltage $V_{c1}$.

Figure 2B:
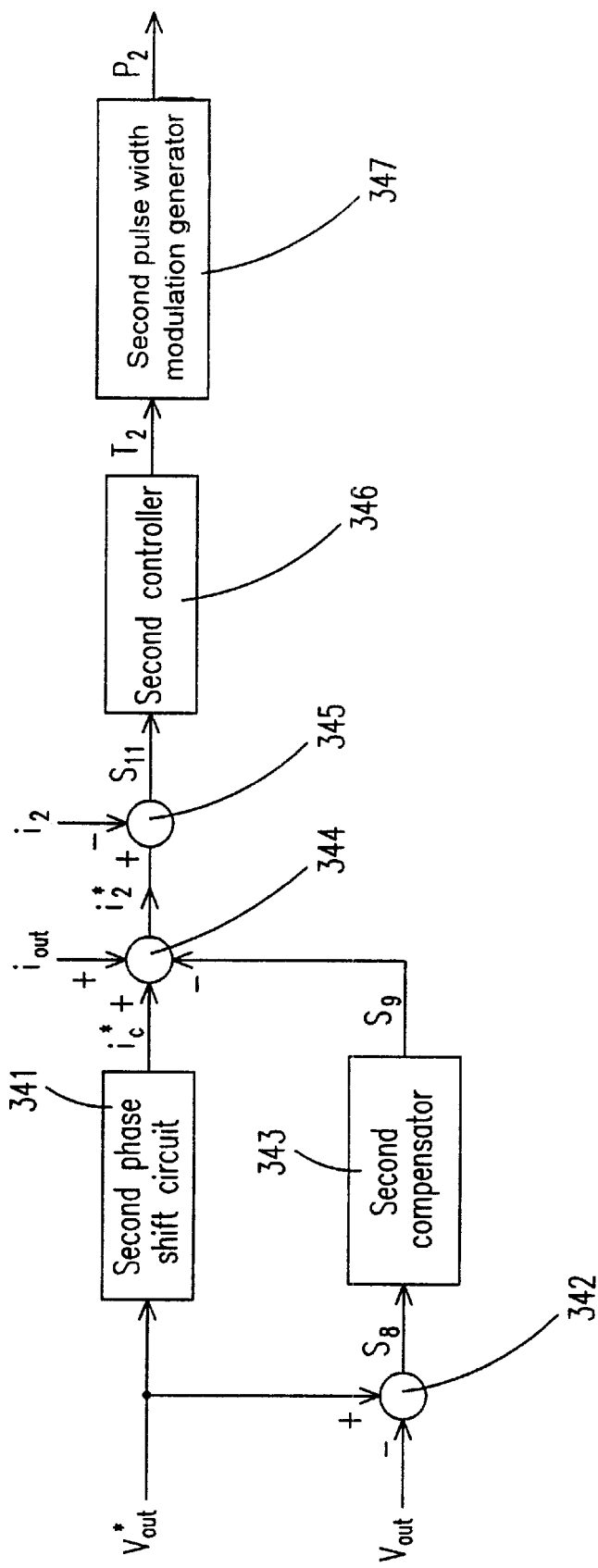
FIG. 2(b) is a block diagram illustrating a second control device according to a preferred embodiment of the present invention.

FIG. 2(b) is a block diagram illustrating a second control device according to a preferred embodiment of the present invention. As shown in FIG. 2(b), the second control device 34 includes a second phase shift circuit 341, a fourth subtractor 342, a second compensator 343, a command synthesizer 344, a fifth subtractor 345, a second controller 346, and a second pulse width modulation generator 347. The second phase shift circuit 341 is electrically connected to a seventh command signal for performing a phase shift of the seventh command signal to generate a reference capacitor current $i^*_c$. The fourth subtractor 342 is electrically connected to the seventh command signal and a feedback signal of the output voltage $V_{out}$ for obtaining a difference of the seventh command signal and the feedback signal of the output voltage $V_{out}$ to generate an eighth command signal $S_8$. The second compensator 343 is electrically connected to the fourth subtractor 342 for compensating the eighth command signal $S_8$ to generate a ninth command signal $S_9$.

The command summing module 344 generates a reference secondary winding current $i^*_2$ by subtracting the ninth command signal $S_9$ from the reference capacitor current $i^*_2$ and adding a feedback signal of an output current $i_{out}$. The fifth subtractor 345 subtracts a feedback signal of a secondary winding current $i_2$ of the transformer 32 from the reference secondary winding current $i^*_2$ to generate an eleventh command signal $S_{11}$. The second controller 346 is electrically connected to the fifth subtractor 345 for processing a signal processing of the eleventh command signal $S_{11}$ to generate a second modulation signal $T_2$. And, the second pulse width modulation generator 347 is electrically connected to the second controller 346 for transforming the second modulation signal $T_2$ to a second pulse width modulation signal $P_2$ which operates the second switching circuit 31 to provide the second voltage $V_c$.

Meanwhile, the seventh command signal is a reference output voltage $V^*_{out}$ of the power supply apparatus, which is in phase with the input voltage $V_{in}$ and has a constant amplitude.

The first power converter is a voltage type power converter, and the second power converter is a current type converter through the above description with reference to the preferred embodiment of the present invention.

Owing to the above descriptions, the present invention provides a power supply apparatus and a method thereof for input harmonic currents suppression and an output voltage regulation. There are many advantages as described in the following:

(1) The input current is a substantial sinusoidal wave and the input power factor is a substantial unity.

(2) If the input voltage is distorted, the first power converter can provide a compensation for the input voltage. Even though the input voltage is distorted, the power supply apparatus also can obtain a substantial sinusoidal wave of the input current. Hence, the power supply apparatus can avoid harmonic input currents injecting to the first power converter.

(3) The reference voltage for the first power converter is the vector addition of the input voltage and a second voltage, which is perpendicular to the input voltage. Therefore, the control circuit of the power supply apparatus is simple and the response time thereof is fast.

(5) Using the second power converter to regulate the output voltage can cause the output voltage in phase with the input voltage. Hence, it can easily operate a bypass circuit in the power supply apparatus.

(6) Using a low switching frequency technique in the first power converter can reduce the switching loss because the first power converter must use a large capacity power converter. On the other hand, the second power converter needs to use a high switching frequency technique to stabilize the output voltage. Therefore, using high switching frequency in the second power converter can reduce the switching loss because the second power converter must use a small capacity power converter.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A power supply apparatus, comprising:
   an input port;
   an output port;
   an energy storage device for providing a first voltage;
   a first power converter electrically connected to said energy storage device for providing a first compensating voltage from said first voltage, and electrically connected in parallel with said input port for controlling said first compensating voltage such that an input current at said input port is a substantial sinusoidal wave and in phase with an input voltage at said input port;
   a link inductor electrically connected between said input port and said first power converter for providing isolation between said input voltage and said first compensating voltage; and a second power converter electrically connected in series with said output port for providing a second compensating voltage from said first voltage to maintain an output voltage at said output port.

2. The power supply apparatus according to claim 1, wherein said power supply apparatus further comprises a backup power supply function, which said first power converter provides said first compensating voltage as a main power when an AC power source at said input port is interrupted.

3. The power supply apparatus according to claim 1, wherein an input power factor at said input port is approaching to a unity power factor.

4. The power supply apparatus according to claim 1, wherein said first compensating voltage is a vector addition of said input voltage and a second voltage where a voltage vector of said second voltage is substantially perpendicular to a voltage vector of said input voltage.

5. The power supply apparatus according to claim 1, wherein said power supply apparatus comprises an uninterruptible power supply (UPS).

6. The power supply apparatus according to claim 1, wherein said first voltage is a DC bus voltage.

7. The power supply apparatus according to claim 1, wherein said energy storage device comprises a battery.

8. The power supply apparatus according to claim 1, wherein said first power converter comprises:

a first switching circuit electrically connected to said energy storage device for providing said first compensating voltage from said first voltage;

a first filter inductor having one end electrically connected to an output end of said first switching circuit and the other end electrically connected to said link inductor for filtering said first compensating voltage;

a first filter capacitor electrically connected in parallel with said first filter inductor for filtering said first compensating voltage; and a first control device electrically connected to said first switching circuit for controlling said first switching circuit to generate said first compensating voltage in response to a first control signal.

9. The power supply apparatus according to claim 8, wherein said first control device comprises:

a first subtractor for subtracting a feedback signal of said first voltage from a first command signal to determine a second command signal;

a first compensator electrically connected to said first subtractor for generating a third command signal by compensating said second command signal;

a sinusoidal signal generator electrically connected to said AC power source for capturing both phase and frequency of said input voltage to generate a first sinusoidal signal;

a first phase shift circuit electrically connected to said sinusoidal signal generator for processing a phase shift of said first sinusoidal signal to generate a second sinusoidal signal;

a multiplier electrically connected to said first phase shift circuit and said first compensator to multiply said third command signal by said second sinusoidal signal to generate a fourth command signal;

a second subtractor electrically connected to said AC power source and said multiplier for subtracting said fourth command signal from an input voltage signal and to generate a fifth command signal;

a third subtractor for subtracting a feedback signal of said first compensating voltage from said fifth command signal to generate a sixth command signal;

a first controller electrically connected to said third subtractor for processing a signal processing of said sixth command signal to generate a first modulation signal; and a first pulse width modulation generator electrically connected to said first controller for transforming said first modulation signal to generate a first pulse width modulation signal which operates said first switching circuit to provide said first compensating voltage.

10. The power supply apparatus according to claim 9, wherein said first command signal is a DC bus reference voltage signal.

11. The power supply apparatus according to claim 9, wherein said feedback signal of said first voltage is a feedback signal of said DC bus voltage.

12. The power supply apparatus according to claim 9, wherein said first phase shift circuit processes a 90° phase shift of said first sinusoidal signal to generate said second sinusoidal signal.

13. The power supply apparatus according to claim 9, wherein said fifth command signal is a reference output voltage signal for said first power converter.

14. The power supply apparatus according to claim 9, wherein said feedback signal of said first compensating voltage is a feedback signal of an output voltage at said first power converter.

15. The power supply apparatus according to claim 1, wherein said second power converter comprises:

a second switching circuit electrically connected to said energy storage device for providing a third voltage from said first voltage;

a transformer having a primary winding electrically connected to said second switching circuit and a secondary winding electrically connected in series between said output port and said input port for transforming said third voltage to generate said second compensating voltage to maintain said output voltage at said output port;

a second filter capacitor electrically connected to said output port for filtering said second compensating voltage; and a second control device electrically connected to said second switching circuit for controlling said second switching circuit to generate said third voltage in response to a second control signal.

16. The power supply apparatus according to claim 15, wherein said second control device comprises:

a second phase shift circuit for generating a capacitor current command signal by processing a phase shift of a seventh command signal;

a fourth subtractor for subtracting a feedback signal of said output voltage from said seventh command signal to generate an eighth command signal;

a second compensator electrically connected to said fourth subtractor for compensating said eighth command signal to generate a ninth command signal;

a command summing module for generating a tenth command signal by subtracting said ninth command signal from said capacitor current command signal and adding a feedback signal of an output current;

a fifth subtractor for subtracting a feedback signal of a secondary winding current of said transformer from said tenth command signal to generate an eleventh command signal;

a second controller electrically connected to said fifth subtractor for processing a signal processing of said eleventh command signal to generate a second modulation signal; and a second pulse width modulation generator electrically connected to said second controller for transforming said second modulation signal to a second pulse width modulation signal which operates said second switching circuit to provide said third voltage.

17. The power supply apparatus according to claim 16, wherein said seventh command signal is a reference output voltage signal for said power supply apparatus which is in phase with said input voltage and has a constant amplitude.

18. The power supply apparatus according to claim 16, wherein said capacitor current signal is a reference capacitor current signal.

19. The power supply apparatus according to claim 16, wherein said tenth command signal is a reference secondary winding current signal.

20. A power supply apparatus, comprising:
   an input port;
   an output port;
   an energy storage device for providing a first voltage;
   a first power converter electrically connected in parallel with said input port and connected to said energy storage device for providing a first compensating voltage from said first voltage as a backup power supply;
   a link inductor electrically connected between said input port and said first power converter for providing voltage isolation between an AC power source at said input port and said first power converter; and
   a second power converter electrically connected in series with said output port for providing a second compensating voltage from said first voltage to maintain said output voltage at said output port.

21. A method of providing input harmonic current suppression, input power factor compensation, and output voltage regulation in a power supply apparatus which has an input port and an output port, wherein said power supply apparatus comprises a first power converter electrically connected in parallel with said input port for providing a first compensating voltage, a link inductor electrically connected between an AC power source at said input port for providing isolation between said AC power source at said input port and said first power converter, and a second power converter electrically connected in series with said output port for providing a second compensating voltage, comprising the steps of:
   controlling said first compensating voltage such that an input current at said input port is a substantial sinusoidal wave and in phase with an input voltage at said input port; and
   controlling said second compensating voltage to maintain said output voltage at said output port.

22. The method according to claim 21, wherein said first compensating voltage is a vector addition of said input voltage and a first voltage where a voltage vector of said first voltage is substantially perpendicular to a voltage vector of said input voltage.

23. The method according to claim 21, wherein said input voltage is in phase with said input current and an input power factor is approaching to a unity power factor.

24. A method of providing input harmonic current suppression, input power factor compensation, and output voltage regulation in a power supply apparatus which has an input port and an output port, wherein said power supply apparatus comprises an energy storage device for providing a first voltage, a first power converter electrically connected in parallel with said input port for providing a first compensating voltage from said first voltage, a link inductor electrically connected between said input port and said first power converter for providing isolation between an AC power source at said input port and said first power converter and a second power converter electrically connected in series with said output port for providing a second compensating voltage to maintain an output voltage at said output port, comprising the steps of:
   determining a magnitude of a first command signal;
   sensing said first voltage to obtain a feedback signal of said first voltage for subtracting a feedback signal of said first voltage from said first command signal to generate a second command signal;
   compensating said second command signal to generate a third command signal;
   capturing both phase and frequency of a sinusoidal wave of said AC power source to generate a first sinusoidal signal;
   processing a phase shift of said first sinusoidal signal to generate a second sinusoidal signal;
   multiplying said third command signal by said second sinusoidal signal to generate a fourth command signal;
   subtracting an input voltage signal by said fourth command signal to generate a fifth command signal;
   subtracting a feedback signal of said first compensating voltage from said fifth command signal to generate a sixth command signal;
   processing a signal processing of said sixth command signal to generate a first modulation signal;
   transforming said first modulation signal to generate a first pulse width modulation signal which operates said first power converter to provide said first compensating voltage, thereby causing said input current as a substantial sinusoidal wave and in phase with said input voltage;
   determining a seventh command signal;
   processing a phase shift of said seventh command signal to generate a capacitor current command signal;
   subtracting a feedback signal of said output voltage from said seventh command signal to generate an eighth command signal;
   compensating said eighth command signal to generate a ninth command signal;
   subtracting said ninth command signal from said capacitor current command signal and adding a feedback signal of said output current signal to generate a tenth command signal;
   subtracting a feedback signal of a secondary winding current from said tenth command signal to generate an eleventh command signal;
   processing a signal processing of said eleventh command signal to generate a second modulation signal; and
   transforming said second modulation signal to a second pulse width modulation signal which operates said second power converter to provide said second voltage to maintain said output voltage at a desired level.

\* \* \* \* \*